(12) United States Patent
Ashraf

(10) Patent No.: US 11,444,938 B2
(45) Date of Patent: Sep. 13, 2022

(54) AUTHENTICATION BASED ON ONE-TIME USERNAMES

(71) Applicant: MICRO FOCUS LLC, Santa Clara, CA (US)

(72) Inventor: Umar Ashraf, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 323 days.

(21) Appl. No.: 16/793,914

(22) Filed: Feb. 18, 2020

(65) Prior Publication Data

US 2021/0258302 A1 Aug. 19, 2021

(51) Int. Cl.
*H04L 9/40* (2022.01)

(52) U.S. Cl.
CPC ........ *H04L 63/0838* (2013.01); *H04L 63/067* (2013.01); *H04L 63/0815* (2013.01)

(58) Field of Classification Search
CPC ............. H04L 63/0807; H04L 63/0815; H04L 63/0823; H04L 63/0838; H04L 63/0846; H04L 63/067
See application file for complete search history.

(56) References Cited

U.S. PATENT DOCUMENTS

| | | | |
|---|---|---|---|
| 8,875,255 B1 | 10/2014 | Dotan et al. | |
| 9,098,687 B2 | 8/2015 | Hayton | |
| 9,374,369 B2 | 6/2016 | Mahaffey et al. | |
| 9,680,812 B1 | 6/2017 | Emaminouri et al. | |
| 10,193,895 B2 * | 1/2019 | Alhothaily | H04W 12/08 |
| 10,536,436 B1 * | 1/2020 | Barbour | H04L 63/0838 |
| 2014/0335903 A1 * | 11/2014 | Takeuchi | H04W 8/24 455/461 |
| 2015/0161417 A1 * | 6/2015 | Kaplan | G06Q 30/0234 235/380 |
| 2016/0255089 A1 * | 9/2016 | Diestler | G06F 21/6236 726/4 |
| 2017/0339163 A1 * | 11/2017 | Alhothaily | H04L 63/108 |
| 2020/0351263 A1 * | 11/2020 | Tiruvaipeta | H04L 63/0853 |
| 2021/0367936 A1 * | 11/2021 | Neumann | H04L 67/306 |

OTHER PUBLICATIONS

"One-Time-Username: A Threshold-based Authentication System", Abdulrahman Alhothaily et al., 2017 International Conference on Identification, Information and Knowledge in the Internet of Things (Year: 2017).*

Michael Daltaon, et al., "Nemesis: Preventing Authentication & Access Control Vulnerabilities in Web Applications", USENIX UNIX Security Symposium, 2009, 16 pages. https://people.csail.mit.edu/nickolai/papers/dalton-nemesis.pdf.

"OWASP Application Security Verification Standard 4.0", Mar. 2019, 68 pages. https://www.owasp.org/images/d/d4/OWASP_Application_Security_Verification__Standard__4.0-en.pdf.

Martin Woschek, "OWASP Cheat Sheets", Feb. 11, 2015, 308 pages. https://www.owasp.org/images/archive/9/9a/20150423200346!OWASP_Cheatsheets_Book.pdf.

* cited by examiner

*Primary Examiner* — Linglan Edwards

(57) ABSTRACT

An apparatus may include a processor that may be caused to receive an authentication request to authenticate a user. The authentication request may include a one-time username associated with an identity of the user and a secret credential of the user. The processor may further identify, in a user registry, a unique user identifier based on the one-time username, and authenticate the user based on the unique user identifier and the secret credential. The apparatus may update the user registry to prevent the one-time username from being used again to identify the user for authentication.

20 Claims, 5 Drawing Sheets

MACHINE-READABLE MEDIUM
500

ACCESS A REQUEST FOR A ONE-TIME USERNAME, THE REQUEST COMPRISING A REFERENCE KEY ASSOCIATED WITH A USER
502

GENERATE THE ONE-TIME USERNAME RESPONSIVE TO THE REQUEST
504

IDENTIFY A UNIQUE USER IDENTIFIER OF THE USER BASED ON THE REFERENCE KEY
506

STORE AN ASSOCIATION OF THE UNIQUE USER IDENTIFIER AND THE ONE-TIME USERNAME IN A USER REGISTRY TO INDICATE THAT THE ONE-TIME USERNAME FOR THE USER IDENTIFIED BY THE UNIQUE USER IDENTIFIER WAS GENERATED
508

PROVIDE THE ONE-TIME USERNAME RESPONSIVE TO THE REQUEST
510

*FIG. 5*

AUTHENTICATION BASED ON ONE-TIME USERNAMES

BACKGROUND

One aspect of gaining unauthorized access to secured systems may be to identify a valid username. Once a valid username is identified, a malicious actor may combine the username with various passwords, which may be obtained via brute force techniques, to attempt to gain access to a secured system.

BRIEF DESCRIPTION OF THE DRAWINGS

Features of the present disclosure may be illustrated by way of example and not limited in the following figure(s), in which like numerals indicate like elements, in which:

FIG. 5 depicts a block diagram of an example non-transitory machine-readable storage medium of generating and providing a one-time username in response to a request for the one-time username.

DETAILED DESCRIPTION

Figure 1:
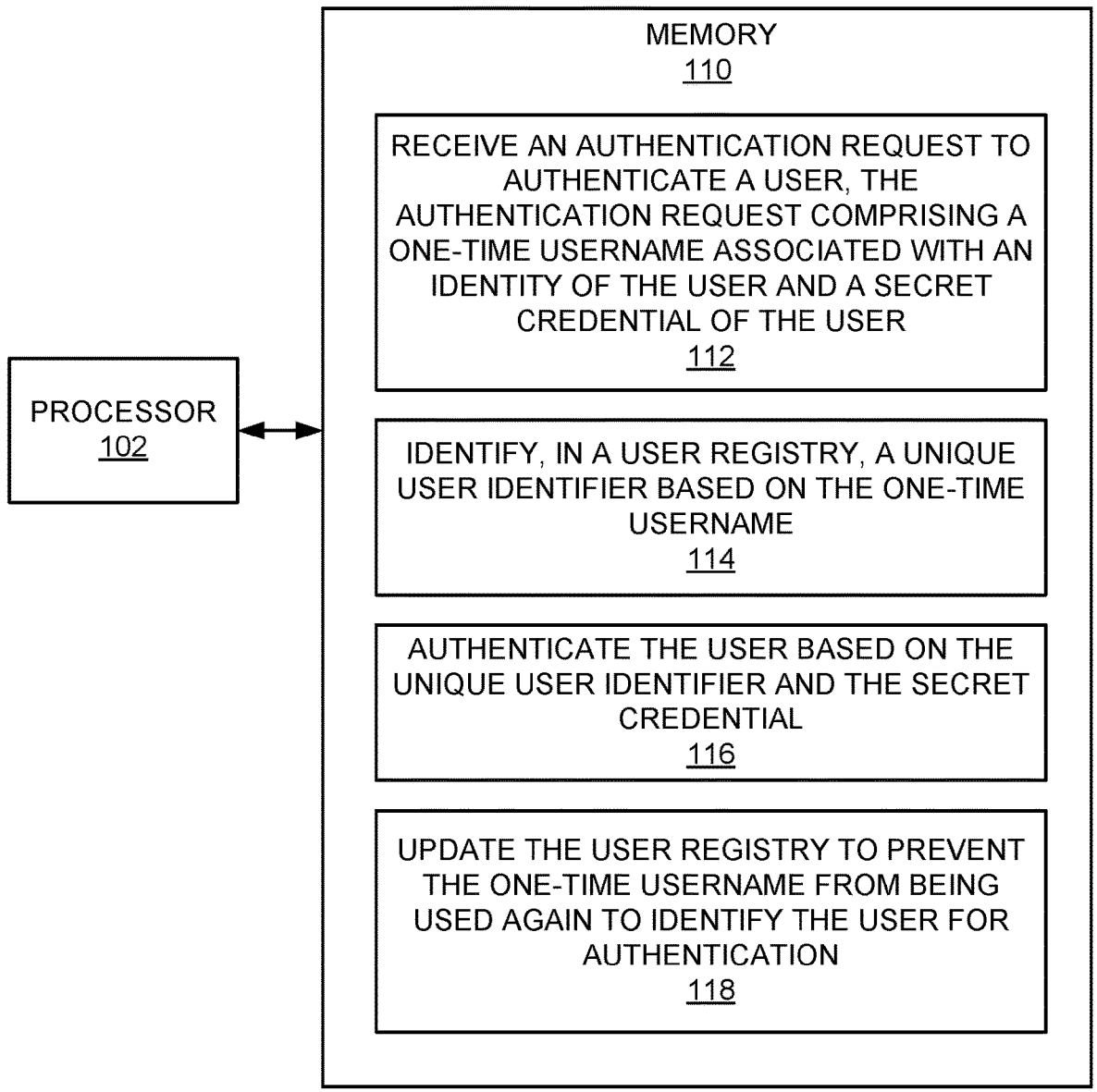
FIG. 1 depicts a block diagram of an example apparatus that authenticates a user based on a one-time username.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Attempts to identify valid usernames, or user enumeration attacks, may be used by malicious actors attempting to gain access to secured systems. Such attacks may be facilitated by system responses to attempted logins. For example, some systems may provide different error messages depending on whether a username is valid, tipping off attackers on whether a given username is a valid one. Other systems may provide the same error message but exhibit different processing times for valid versus invalid usernames. For example, a system may take a longer amount of time to return an error message for an invalid username compared to a valid username (where the valid username may be input with an invalid password). Usernames may be compromised in other ways as well, such as through phishing or other attacks.

Disclosed herein are improved apparatuses, methods, and machine-readable media that may mitigate the compromise of usernames such resulting from user enumeration and/or other attacks by using a one-time username (OTUN). An OTUN may refer to identifying information that is usable to identify a user for a limited number of times such as only once and/or expire after a predefined period of time for user authentication purposes. Thus, even if an attacker is able to discover, intercept or otherwise obtain an OTUN that has been used for the limited number of times for authentication and/or has expired, the OTUN may be invalid for use in subsequent authentications.

To register a user to use a system for authentication, the system may generate a unique user identifier (UUID), a reference key (REF-KEY), and a signature key (SIG-KEY). The user may select a secret credential such as a password during the registration process or the secret credential may itself be a one-time password (OTP). The UUID, REF-KEY, and SIG-KEY may be stored in association together in a secure database inaccessible to users. The user (e.g., the user device of the user) may be provided with the REF-KEY and the SIG-KEY but not the UUID, which may be maintained in secret by the system. The system-generated UUID, together with the secret credential, may be used in authentication processes.

When the user wishes to be authenticated via a user device, the user device may transmit a request for an OTUN with the REF-KEY. The request may be digitally signed with the SIG-KEY (which may be a cryptographic key). Public key/private key cryptography may be used to verify that the user digitally signed the request, which may provide a first factor of challenge-based security. The system may identify the appropriate SIG-KEY based on the REF-KEY, verify that the request was digitally signed by the SIG-KEY, and lookup the UUID based on the REF-KEY. The system may generate, such as via a random number generator, the OTUN for the user.

The OTUN may be stored in association with the UUID in a storage such as a user registry to indicate that the OTUN has been generated for the UUID. Such storage may be in runtime cache, which may be non-persistent storage, that removes the OTUN-UUID association after OTUN use and/or periodically. In some examples, the runtime cache may be overwritten with new data to remove the OTUN, UUID, and/or the OTUN-UUID association from the user registry.

The OTUN may be provided to the user device, which may then submit an authentication request with the OTUN and the secret credential. Thus, the secret credential may provide a second factor of challenge-based security.

Responsive to the authentication request, the system may look up the OTUN in the user registry and identify the UUID. If the OTUN is not in the user registry or is otherwise indicated to have been used, then the authentication may fail, thereby enforcing single-use and/or time-expired use of the OTUN. If the OTUN is in the user registry or is otherwise indicated not to have been used, then the system may look up the UUID associated with the OTUN and authenticate the user based on the UUID and the secret credential.

The disclosure may provide multi-factor (such as two-factor) authentication through the use of the OTUN, which may be delivered through a secure channel. Coupled with digital signatures and/or a user-selected or other secret credential, the system may provide multi-factor protection. The foregoing may improve authentication systems to be more secure. Additionally, the disclosure may improve user experience since compromised accounts may face issues resulting from account lockout policies and because, in some instances, the user may have to provide only a secret credential and not a username. In some examples, the disclosure may address account suspension problems that may occur with brute force attacks since the user-identifier is stored only on the user database and not provided to users. Even if an attacker finds a legitimate OTUN, the OTUN may be invalid for subsequent authentications. As such, an attacker may be prevented from causing a legitimate user to be locked out by employing brute force attacks. In this manner, defensive measures such as Completely Automated Public Turing test to tell Computers and Humans Apart (CAPTCHA), Internet Protocol address blocking, rate limiting, and others may be minimized, both improving security and user-experience in having to deal with these and other measures.

FIG. 1 depicts a block diagram of an example apparatus 100 that authenticates a user based on an OTUN. The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. It should be understood that the example apparatus 100 depicted in FIG. 1 may include additional features and that some of the features described herein may be removed and/or modified without departing from the scope of the example apparatus 100.

Returning to FIG. 1, the processor 102 may fetch, decode, and execute the instructions 112 to receive an authentication request to authenticate a user. The authentication request may include an OTUN associated with an identity of the user and a secret credential (such as a password) of the user.

The processor 102 may fetch, decode, and execute the instructions 114 to identify, in a user registry (such as the user registry 301), a UUID based on the OTUN. The processor 102 may fetch, decode, and execute the instructions 116 to authenticate the user based on the UUID and the secret credential. The processor 102 may fetch, decode, and execute the instructions 118 to update the user registry to prevent the OTUN from being used again to identify the user for authentication.

In some examples, the processor 102 may receive, prior to receipt of the authentication request, a request for the OTUN (OTUN request). The OTUN request may include the REF-KEY, generate the OTUN responsive to the OTUN request. The processor 102 may identify the UUID based on the REF-KEY and the user database (such as the user DB 203 illustrated in FIG. 2), and store, in the user registry, an association of the UUID and the OTUN to indicate generation of the OTUN with respect to the UUID.

Figure 2:
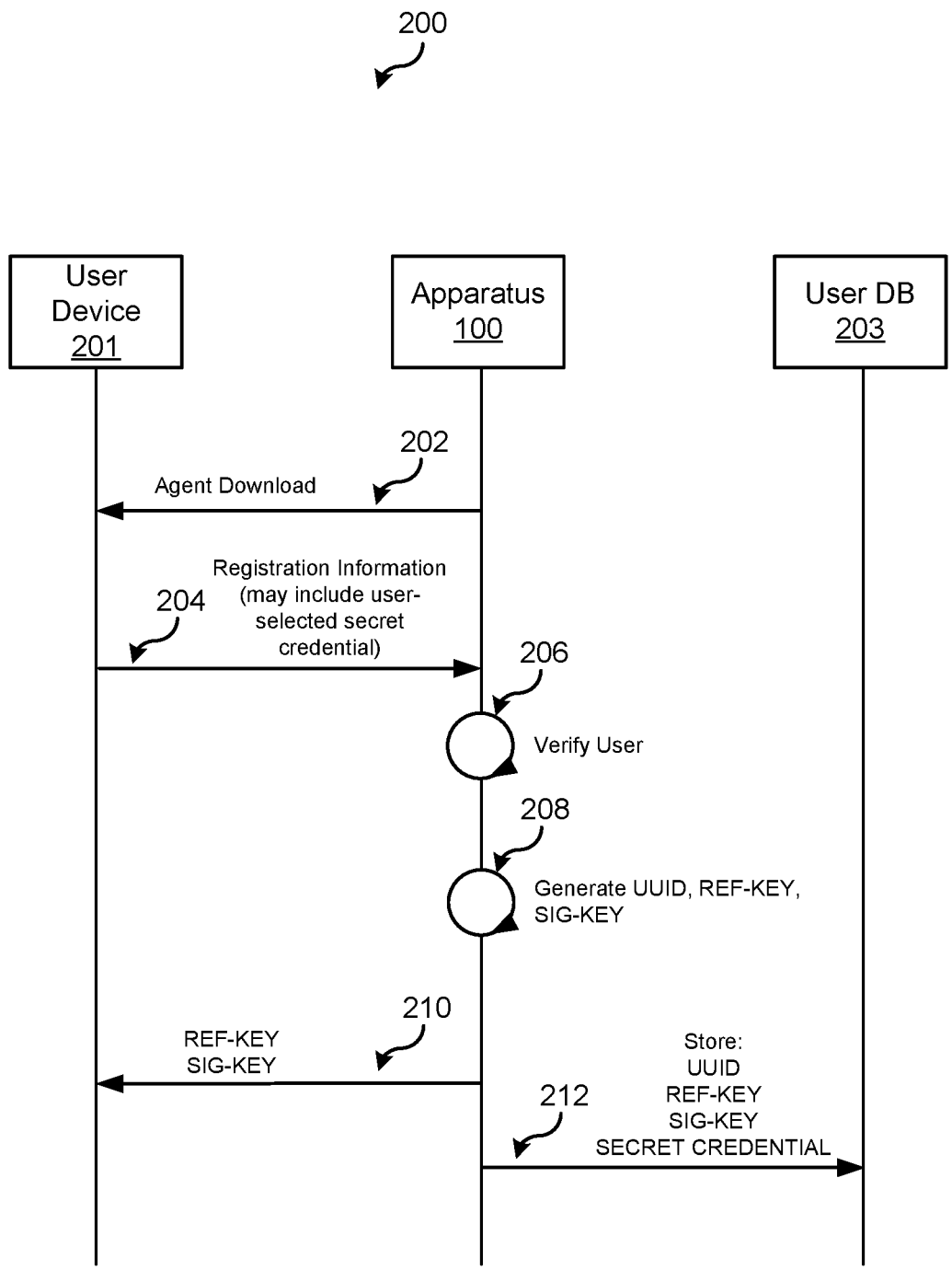
FIG. 2 depicts a data flow diagram of a system that includes the apparatus depicted in FIG. 1 for registering a user to use one-time usernames for user authentication.

FIG. 2 depicts a data flow diagram 200 of a system that includes the apparatus 100 depicted in FIG. 1 for registering a user to use one-time usernames for user authentication. At 202, a user device 201 may download an agent from the apparatus 100 and/or other source. The agent may include instructions that program a processor of the user device 201 to request OTUNs. For example, the agent may include a mobile application that executes at the user device 201, a browser plugin, browser scripts, and/or other instructions that program the processor of the user device 201. The processor of the user device 201 may be similar to the processor 102 illustrated in FIG. 1. The agent may be stored at a memory of the user device 201. The memory may be similar to the memory 110 illustrated in FIG. 1. In the examples that follow, the user device 201 will be described as performing or otherwise participating in a given operational block (such as 202). It should be noted that the agent and/or other instructions may program the processor of the user device 201 to perform or otherwise participate in such block.

At 204, the user device 201 may prompt a user to register for authentication. For example, a new user may be prompted to provide registration information to use the authentication system described herein. In some examples, the registration information may include a user-selected secret credential such as a password or PIN. Additionally, or alternatively, other types of secret credentials may be used, whether system-defined or user-selected. In some examples, the registration information may include an email address or other electronic address for verification purposes.

At 206, the apparatus 100 may verify the source of the registration information. For example, the apparatus 100 may use an email one-time password (OTP) verification in which an email address included in the registration information is provided with an OTP for verification. Other types of verification may be used to register users as well. At 208, the apparatus 100 may generate the UUID, the REF-KEY, and the SIG-KEY based on the registration information. At 210, the apparatus 100 may provide the REF-KEY and the SIG-KEY, but not the UUID, to the user device 201. At 212, the apparatus 100 may store the UUID, the REF-KEY, the SIG-KEY, and the secret credential in association with one another in a user database 203.

In some examples, the REF-KEY may be refreshed upon occurrence of a REF-KEY renewal triggering event. The REF-KEY renewal triggering event may include a predefined number of uses of the REF-KEY, duration of time since the REF-KEY was generated or provided to the user device 201, and/or other event that limits the use of a given REF-KEY for a user. For example, the user device 201 may access an indication of the REF-KEY renewal triggering event and request a new REF-KEY from the apparatus 100. Alternatively, or additionally, the apparatus 100 may access an indication of the occurrence of the REF-KEY renewal triggering event and push a new REF-KEY to the user device 201. The foregoing may further narrow down an attack window in the event a REF-KEY is compromised. In some examples, such REF-KEY refresh may be transparent to the user (in that the user may not request or even be aware of such refresh).

Figure 3:
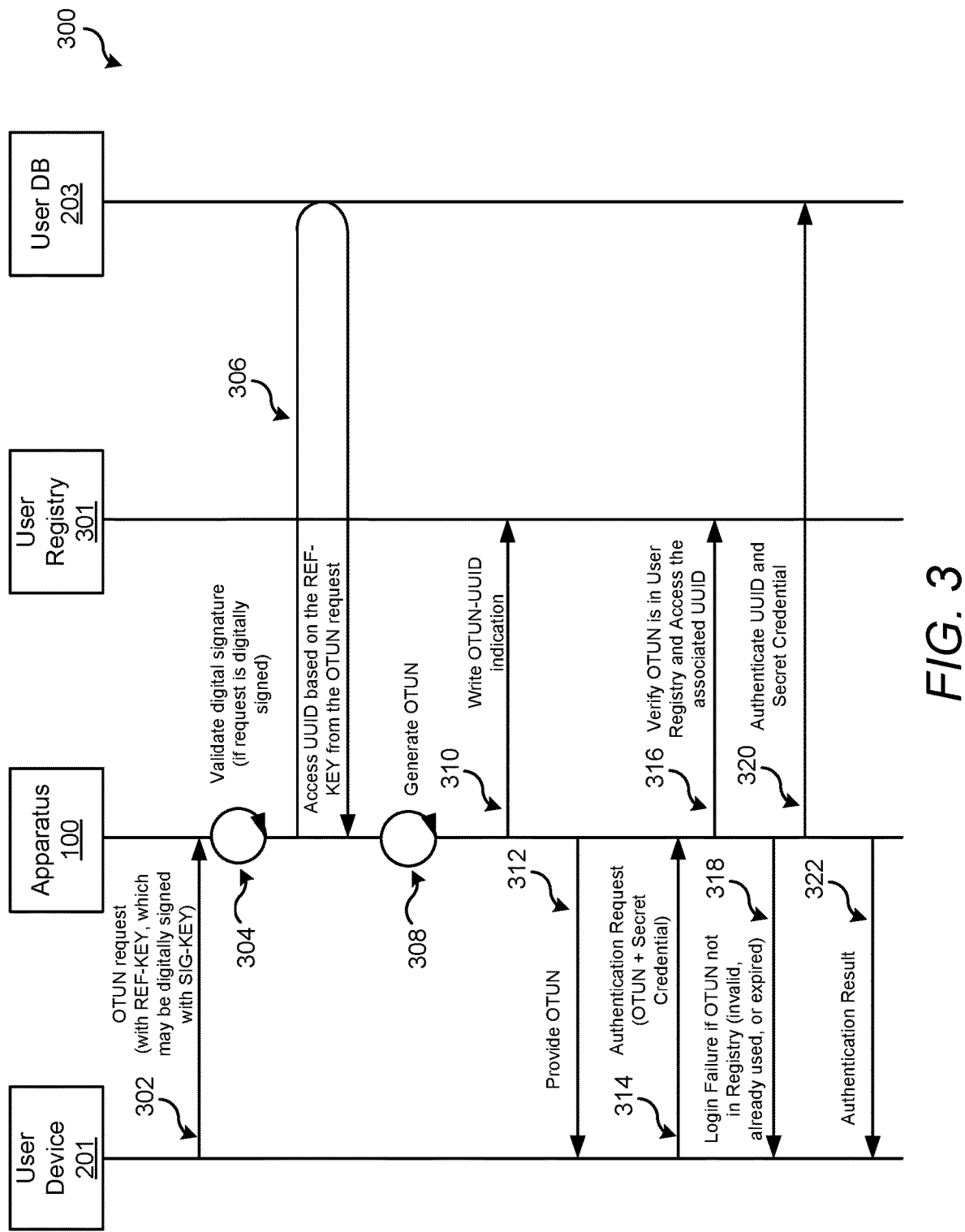
FIG. 3 depicts a data flow diagram of the system depicted in FIG. 2 for authenticating a user based on a one-time username.

When a user is registered to use the system as described in the example data flow diagram 200, the user device 201 may request and use an OTUN for authenticating the user. As an example, FIG. 3 depicts a data flow diagram 300 of the system depicted in FIG. 2 for authenticating a user based on the OTUN.

At 302, the user device 201 may transmit a request for an OTUN ("OTUN request") to the apparatus 100. The request may be triggered by, for example, a user accessing the agent to request the OTUN, a user accessing a local or remote application that requires user authentication, and/or other triggering event. In some examples, the OTUN request may include the REF-KEY generated for the user during the registration process. In some examples, the REF-KEY may be provided to the apparatus 100 transparently to the user (such as without a user inputting the REF-KEY). In some examples, the OTUN request may be digitally signed with the SIG-KEY generated for the user during the registration process.

At 304, in examples in which the OTUN request (or portion thereof, or other piece of signed data) is digitally signed, the apparatus 100 may validate the digital signature. For example, the apparatus 100 may access the SIG-KEY from the user database based on the REF-KEY and verify that the digitally signed request was signed with the SIG-KEY. In some examples, to do so, the apparatus 100 may derive a public key from the SIG-KEY stored in the user database and apply public key cryptography to determine whether the SIG-KEY was used to digitally sign the OTUN request. If the SIG-KEY was not used to digitally sign the OTUN request then the result of decrypting the signed data will not match an expected result provided by the sender (user device 201). In some examples, the public key may be generated at the time of generating the SIG-KEY.

At 306, the apparatus 100 may access the user database 203 to determine the UUID that corresponds to the REF-KEY included in the OTUN request.

At 308, the apparatus 100 may generate an OTUN for the user. For example, the OTUN may be system-generated without user input from the user (such as without the user creating the OTUN). For example, to generate the OTUN, the apparatus 100 may generate a random number based on a pseudo random number generator.

At 310, the apparatus 100 may write (store) an association between the generated OTUN and the UUID to a user registry 301. In some examples, the user registry 301 may include a memory such as a runtime cache, which may be non-persistent storage, that removes the OTUN-UUID association after OTUN use and/or periodically. In some examples, the runtime cache may be overwritten with new data to remove OTUN, UUID, and/or the OTUN-UUID association from the user registry. In some examples, the user registry 301 may include a database or other storage repository that persistently stores OTUN and UUID associations, among other data.

For examples in which the OTUN expires after a predefined duration of time, the apparatus 100 may further write a time associated with the OTUN. The time may indicate a time that the OTUN was generated, a time that the OTUN was provided to the user device 201, and/or a time at which the OTUN is to expire. Such time may be used by a background process that may periodically clear the user registry 301 of expired OTUNs.

At 312, the apparatus 100 may provide the OTUN to the user device 201.

At 314, the user device 201 may transmit an authentication request to the apparatus 100. The authentication request may include the OTUN received from the apparatus 100 at 312. It should be noted that the authentication request may be provided to an authentication server associated with the apparatus 100. That is, the apparatus 100 may include a collection of servers and processors that may perform various functions of the apparatus (such as providing OTUNs, authenticating users, etc.).

At 316, the apparatus 100 may verify that the OTUN exists in the user registry 301. Existence of the OTUN in the user registry 301 may indicate that the OTUN was generated for the user, has not been used for authentication, and/or is not expired. On the other hand, if the OTUN is not in the user registry 301, this may indicate that the OTUN was not generated for the user, has already been used for authentication, and/or has expired. It should be noted that instead of removing the OTUN after use or expiration, the user registry 301 may be updated to indicate that the OTUN is no longer valid.

At 318, the apparatus 100 may generate and provide a login failure notification to the user device 201 if the OTUN is not in the user registry 301. For example, the apparatus 100 may deny authentication if the OTUN is not in the user registry 301 (resulting from a deletion from the user registry 301 or that the OTUN never existed) is indicated that the OTUN should not be used again for authentication. It should be noted that the login failure notification may be the same whether or not the OTUN is found to be valid. Furthermore, the login failure notification may be provided after a predefined or random amount of time has elapsed so that the length of time of such failure notification may not be used for user enumeration attacks on OTUNs (even though such attacks are mitigated using the OTUN request and multi-factor authentication described herein).

At 320, if the OTUN exists in the user registry 301, the apparatus 100 may look up the UUID from the user registry based on the REF-KEY, and authenticate the UUID and the secret credential. Upon authentication, the apparatus 100 may update the user registry 301 to indicate use of the OTUN such as by removing the OTUN from the user registry, storing an indication that the OTUN is no longer valid, and/or otherwise indicating that the OTUN is no longer to be used for subsequent user authentications. It should be noted that in some examples, instead of an OTUN, a limited-use username may be used in which a username may be generated and used in the same manner as the OTUN described herein, except that the limited-use username may expire after a predefined number of uses greater than 1 and/or during a limited duration of time. In these examples, the limited-use username may be used, for example, five times before a new limited-use username is to be generated and/or any number of times within thirty seconds after the limited-use username has been generated.

At 322, the apparatus 100 may provide an authentication result to the user device 201. Similar to block 318, in some examples, the authentication result may be provided to the user device 201 after a predefined or random period of time has elapsed. In some examples, after a number of authentications using the OTUN that reaches the limited use (such as a single use, multi-use, or time-expired use), the OTUN may be deleted from the user registry 301 and/or the user registry 301 may be updated to indicate use of the OTUN.

Figure 4:
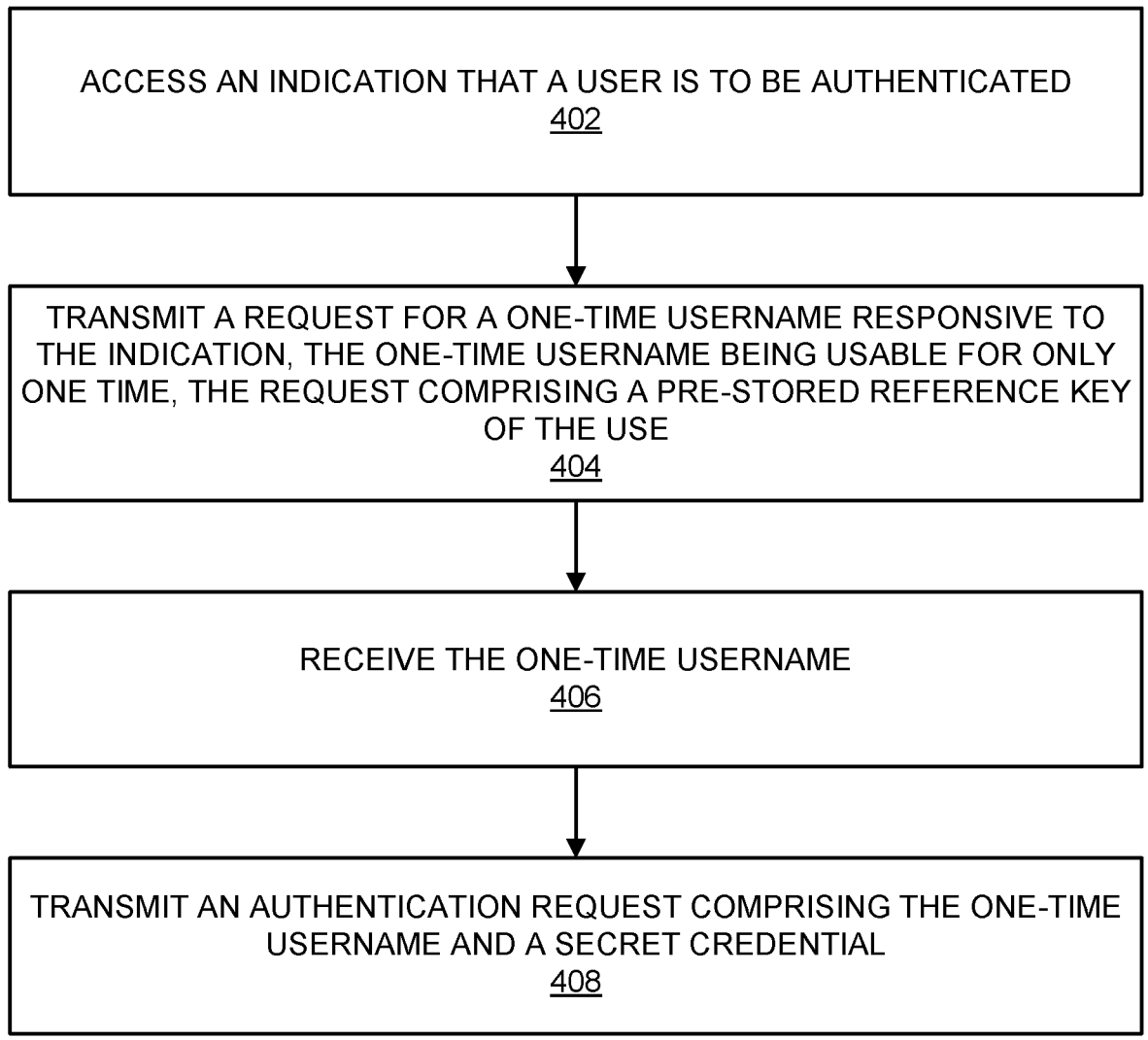
FIG. 4 depicts a flow diagram of an example method of requesting a one-time username.

Various manners in which the apparatus 100 may operate to authenticate a user based on OTUNs are discussed in greater detail with respect to the method 400 depicted in FIG. 4. It should be understood that the method 400 may include additional operations and that some of the operations described therein may be removed and/or modified without departing from the scope of the methods. The description of the method 400 may be made with reference to the features depicted in FIGS. 1, 2, and 3 for purposes of illustration.

At block 402, the method 400 may include accessing, by a processor, an indication that a user is to be authenticated. At block 404, the method 400 may include transmitting, by the processor, a request for an OTUN responsive to the indication, the OTUN being usable for only one time, the request comprising a pre-stored REF-KEY of the user. At block 406, the method 400 may include receiving the OTUN. In some examples, the method 400 may include generating an input to receive the secret credential such as through a login form, and accessing the secret credential via the input. In other examples, the method 400 may obtain an OTP to use as the secret credential. At block 408, the method 400 may include transmitting an authentication request comprising the OTUN and the secret credential.

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory machine-readable (such as computer-readable) storage medium. Examples of non-transitory machine-readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory machine-readable storage medium of generating and providing an OTUN in response to a request for the OTUN. The machine-readable instructions 502 may cause the processor (such as processor 102 illustrated in FIG. 1) to access a request for an OTUN (OTUN request). The OTUN request may include a REF-KEY associated with a user.

The machine-readable instructions 504 may cause the processor to generate the one-time username responsive to the request. The machine-readable instructions 506 may cause the processor to identify a UUID of the user based on the REF-KEY. The machine-readable instructions 508 may cause the processor to store an association of the UUID and the one-time username in a user registry to indicate that the one-time username for the user identified by the UUID was generated. The machine-readable instructions 510 may cause the processor to provide the OTUN responsive to the OTUN request.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a database storing authentication information of a user, the authentication information including a unique user identifier of the user and a reference key, wherein the reference key is provided to the user and the unique user identifier is not provided to the user;
a processor, and
a non-transitory machine-readable medium storing instructions that when executed by the processor, cause the processor to:
receive a first request for a one-time username from a user device, wherein the first request includes the reference key;
identify, in the database, the unique user identifier that corresponds to the reference key included in the first request;
in response to the unique user identifier being identified in the database, generate the one-time username to the user;
receive a second request to authenticate the user, the second request comprising the one-time username and a secret credential of the user;
identify, in a user registry, the unique user identifier based on the one-time username included in the second request;
authenticate the user based on the unique user identifier identified in the user registry and the secret credential included in the second request; and
update the user registry to prevent the one-time username from being used again to authenticate the user.

2. The apparatus of claim 1, wherein the user is registered to be authenticated during a registration process, and wherein the instructions when executed further cause the processor to:
generate, during the registration process, the unique user identifier and the reference key of the user;
store, in the database, an association of the unique user identifier and the reference key as the authentication information of the user; and
provide the reference key, but not the unique user identifier, as an output of the registration process to maintain secrecy of the unique user identifier.

3. The apparatus of claim 2, wherein the unique user identifier is generated without user input.

4. The apparatus of claim 2, wherein the instructions when executed further cause the processor to:
after the one-time username is generated, store, in the user registry, an association of the unique user identifier and the one-time username to indicate generation of the one-time username with respect to the unique user identifier.

5. The apparatus of claim 2, wherein the instructions when executed further cause the processor to:
generate, during the registration process, a signature key for the user to digitally sign requests;
store, in the database, an association of the signature key and the reference key; and
provide the signature key as an output of the registration process.

6. The apparatus of claim 5, wherein the signature key comprises a cryptographic key.

7. The apparatus of claim 5, wherein the fir request for the one-time username is digitally signed with the signature key of the user, and wherein the instructions when executed further cause the processor to:
access the signature key from the database based on the reference key included in the first request; and
verify that the first request was signed with the signature key.

8. The apparatus of claim 1, wherein to generate the one-time username, the instructions when executed cause the processor to:
  generate a random number based on a pseudo random number generator.

9. The apparatus of claim 1, wherein the instructions when executed further cause the processor to:
  access an indication of a reference key renewal triggering event;
  generate a new reference key in response to the reference key renewal triggering event; and
  provide the new reference key to the user device to replace the reference key.

10. The apparatus of claim 1, wherein the user registry comprises a runtime cache of the apparatus that is overwritten with new data to remove the one-time username from the user registry.

11. The apparatus of claim 1, wherein the user registry comprises a stored association between the one-time username and the unique user identifier, and wherein to update the user registry, the instructions when executed further cause the processor to:
  update the stored association with an indication to prevent the one-time username from being used again.

12. The apparatus of claim 1, wherein the user registry comprises a stored association between the one-time username and the unique user identifier, and wherein to update the user registry, the instructions when executed further cause the processor to:
  delete the stored association from the user registry to prevent the one-time username from being used again.

13. A non-transitory machine-readable medium storing instructions that when executed by a processor, cause the processor to:
  store, in a database, authentication information of a user, the authentication information including a unique user identifier of the user and a reference key, wherein the reference key is provided to the user and the unique user identifier is not provided to the user;
  receive a first request for a one-time username, the first request comprising the reference key associated with the user;
  identify, in the database, the unique user identifier of the user based on the reference key included in the first request;
  in response to the unique user identifier being identified in the database, generate the one-time username responsive to the first request;
  receive a second request to authenticate the user, the second request comprising the one-time username and a secret credential of the user;
  identify, in a user registry, the unique user identifier based on the one-time username included in the second request; and
  authenticate the user based on the unique user identifier identified in the user registry and the secret credential included in the second request.

14. The non-transitory machine-readable medium of claim 13, wherein the instructions when executed further cause the processor to:
  update the user registry to prevent the one-time username from being used again to authenticate the user.

15. The non-transitory machine-readable medium of claim 13, wherein the user registry comprises a temporary cache storing an association of the unique user identifier and the one-time username, the instructions when executed further cause the processor to:
  update the temporary cache to remove the stored association of the unique user identifier and the one-time username;
  receive a third request to authenticate the user, the third request comprising the one-time username;
  determine that the one-time username does not exist in the user registry; and
  deny authentication based on the determination that the one-time username does not exist in the user registry.

16. The non-transitory machine-readable medium of claim 13, wherein the first request is digitally signed with a signature key of the user, and wherein the instructions when executed further cause the processor to:
  access the signature key based on the reference key included in the first request; and
  verify that the first request was signed with the signature key.

17. A method, comprising:
  storing, in a database, authentication information of a user, the authentication information including a unique user identifier of the user and a reference key, wherein the reference key is provided to the user and the unique user identifier is not provided to the user;
  receiving, by a processor, a first request for a one-time username from a user device, the first request comprising the reference key associated with the user;
  identifying, by the processor, the unique user identifier in the database based on the reference key included in the first request; and
  in response to the unique user identifier being identified in the database, generating, by the processor, the one-time username to the user;
  receiving a second request to authenticate the user, the second request comprising the one-time username and a secret credential;
  identifying the unique user identifier in a user registry based on the one-time username included in the second request; and
  authenticate the user based on the unique user identifier identified in the user registry and the secret credential included in the second request.

18. The method of claim 17, further comprising:
  updating the user registry to prevent the one-time username from being used again to authenticate the user.

19. The method of claim 17, wherein the first request for the one-time username is digitally signed with a signature key of the user, and the method further comprises:
  accessing the signature key based on the reference key included in the first request; and
  verifying that the first request was signed with the signature key.

20. The method of claim 19, further comprising:
  generating, by the processor, the unique user identifier of the user, the reference key and the signature key during a registration process of the user, and
  storing the unique user identifier, the reference key and the signature key as the authentication information of the user in the database.

* * * * *